United States Patent
Merz et al.

(10) Patent No.: US 12,288,240 B2
(45) Date of Patent: *Apr. 29, 2025

(54) SYSTEMS AND METHODS FOR GENERATING RECOMMENDATIONS USING A CORPUS OF DATA

(71) Applicant: MASTERCARD INTERNATIONAL INCORPORATED, Purchase, NY (US)

(72) Inventors: Christopher John Merz, Wildwood, MO (US); Walter F. Lo Faro, Chesterfield, MO (US); Peng Yang, Sunnyvale, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,923

(22) Filed: Oct. 13, 2023

(65) Prior Publication Data

US 2024/0037633 A1    Feb. 1, 2024

Related U.S. Application Data

(63) Continuation of application No. 17/502,839, filed on Oct. 15, 2021, now Pat. No. 11,790,431, which is a
(Continued)

(51) Int. Cl.
*G06Q 30/00* (2023.01)
*G06F 7/08* (2006.01)
(Continued)

(52) U.S. Cl.
CPC .......... *G06Q 30/0631* (2013.01); *G06F 7/08* (2013.01); *G06Q 30/0255* (2013.01); *G06Q 30/0282* (2013.01); *G06Q 30/0625* (2013.01)

(58) Field of Classification Search
CPC ............... G06Q 30/00; G06Q 30/0601; G06Q 30/0613; G06Q 30/0619
See application file for complete search history.

(56) References Cited

U.S. PATENT DOCUMENTS

| 4,914,615 A | 4/1990 | Karmarkar et al. |
| 7,133,859 B1 * | 11/2006 | Wong .................... G06Q 10/10 |
| | | 455/418 |

(Continued)

FOREIGN PATENT DOCUMENTS

| CN | 102750647 A | 10/2012 |
| CN | 102799671 A | 11/2012 |

(Continued)

OTHER PUBLICATIONS

Merchant, Arpit, and Navjyoti Singh. "Hybrid trust-aware model for personalized top-n recommendation." Proceedings of the 4th ACM IKDD Conferences on Data Sciences. 2017. (Year: 2017).*

(Continued)

*Primary Examiner* — Christopher B Seibert
(74) *Attorney, Agent, or Firm* — Armstrong Teasdale LLP

(57) ABSTRACT

A method and system for recommending a merchant are provided. The method includes receiving financial transaction data documenting financial transactions between a plurality of account holders and a plurality of merchants and generating a merchant correspondence matrix that includes the plurality of merchants and a plurality of indicators of interactions associated with pairs of the plurality of merchants. The plurality of indicators of interactions tallying financial transactions conducted by the plurality of account holders at both of the merchants in a pair of the plurality of merchants. The method further includes receiving a query for a recommendation of a merchant from an account holder and generating a ranked list of merchants based on a recommender algorithm. The recommender algorithm infer- (Continued)

ring user preferences from attributes of the plurality of merchants that were visited by the cardholder.

17 Claims, 12 Drawing Sheets

Related U.S. Application Data continuation of application No. 15/374,751, filed on Dec. 9, 2016, now abandoned.

(60) Provisional application No. 62/266,419, filed on Dec. 11, 2015.

(51) Int. Cl.
- *G06Q 30/0251* (2023.01)
- *G06Q 30/0282* (2023.01)
- *G06Q 30/0601* (2023.01)

(56) References Cited

U.S. PATENT DOCUMENTS

| | | | |
|---|---|---|---|
| 7,533,038 B2 | 5/2009 | Blume et al. | |
| 8,150,741 B2* | 4/2012 | Figueroa | G06Q 30/0639 705/26.1 |
| 9,195,769 B2 | 11/2015 | Schiff et al. | |
| 9,361,627 B2 | 6/2016 | Chang et al. | |
| 9,367,563 B2* | 6/2016 | Fontebride | G06F 16/1873 |
| 2002/0026348 A1* | 2/2002 | Fowler | G06Q 30/0208 705/14.13 |
| 2004/0054560 A1* | 3/2004 | Levionnais | G06Q 20/346 705/5 |
| 2004/0204845 A1* | 10/2004 | Wong | G08G 1/096838 340/995.22 |
| 2004/0236660 A1* | 11/2004 | Thomas | G06Q 40/04 705/37 |
| 2004/0249749 A1* | 12/2004 | Strayer | G06Q 40/00 705/39 |
| 2005/0197767 A1* | 9/2005 | Nortrup | G01C 21/3492 340/995.19 |
| 2007/0094066 A1 | 4/2007 | Kumar et al. | |
| 2007/0106468 A1* | 5/2007 | Eichenbaum | G06Q 30/02 701/431 |
| 2007/0141222 A1* | 6/2007 | Binder | C11B 5/00 426/601 |
| 2007/0150369 A1* | 6/2007 | Zivin | G06Q 30/0631 705/26.7 |
| 2007/0244741 A1* | 10/2007 | Blume | G06Q 30/0269 705/7.31 |
| 2008/0082373 A1* | 4/2008 | Durocher | G06Q 30/00 705/6 |
| 2009/0037355 A1* | 2/2009 | Brave | G06F 16/9535 706/45 |
| 2009/0157513 A1* | 6/2009 | Bonev | G06Q 30/0273 707/999.005 |
| 2009/0158200 A1* | 6/2009 | Palahnuk | G06Q 30/0273 715/781 |
| 2009/0177301 A1* | 7/2009 | Hayes | G11B 19/025 707/999.005 |
| 2009/0210143 A1* | 8/2009 | Seltzer | G01C 21/28 701/532 |
| 2009/0271246 A1 | 10/2009 | Alvarez et al. | |
| 2009/0313299 A1* | 12/2009 | Bonev | G06F 16/285 |
| 2010/0069035 A1* | 3/2010 | Johnson | H04W 4/02 455/566 |
| 2010/0250290 A1* | 9/2010 | Lefkowitz | G06Q 30/0603 705/17 |
| 2011/0202393 A1* | 8/2011 | DeWakar | G06Q 20/3223 705/13 |
| 2011/0225068 A1* | 9/2011 | Figueroa | G06F 16/29 701/533 |
| 2012/0123909 A1* | 5/2012 | Kamenov | G06Q 50/14 705/27.1 |
| 2013/0035856 A1* | 2/2013 | Connors | H04W 4/024 701/484 |
| 2013/0103438 A1* | 4/2013 | Vernitsky | G06Q 10/025 705/6 |
| 2013/0246120 A1* | 9/2013 | Chang | G06Q 30/0201 705/7.29 |
| 2013/0275037 A1* | 10/2013 | Minvielle | G16H 70/00 707/705 |
| 2013/0275426 A1* | 10/2013 | Minvielle | G06F 16/284 707/736 |
| 2013/0275460 A1* | 10/2013 | Minvielle | G06F 16/24 707/769 |
| 2013/0324074 A1* | 12/2013 | Way | H04W 4/024 455/456.1 |
| 2013/0325839 A1* | 12/2013 | Goddard | G06F 16/9537 707/708 |
| 2013/0339498 A1* | 12/2013 | Johnson | H04L 67/104 709/221 |
| 2014/0005848 A1* | 1/2014 | Melen | G06Q 10/06311 700/291 |
| 2014/0052714 A1* | 2/2014 | Brodziak | G06F 16/245 707/722 |
| 2014/0067564 A1* | 3/2014 | Yuan | G06Q 30/0641 705/16 |
| 2014/0095273 A1* | 4/2014 | Tang | G06Q 30/0283 705/14.1 |
| 2014/0188615 A1* | 7/2014 | Badenhop | G06Q 30/0267 705/14.58 |
| 2014/0188616 A1* | 7/2014 | Badenhop | G06Q 30/0267 705/14.58 |
| 2014/0279185 A1 | 9/2014 | Merz et al. | |
| 2014/0325593 A1* | 10/2014 | Newton | H04L 63/102 726/2 |
| 2014/0372338 A1* | 12/2014 | Kim | G06Q 30/0282 705/347 |
| 2015/0019290 A1 | 1/2015 | Downton | |
| 2015/0026070 A1 | 1/2015 | Groarke et al. | |
| 2015/0032565 A1 | 1/2015 | Weis et al. | |
| 2015/0112826 A1* | 4/2015 | Crutchfield, Jr. | G06Q 30/0643 705/26.1 |
| 2015/0149220 A1* | 5/2015 | Omar | G06Q 10/02 705/5 |
| 2015/0161610 A1* | 6/2015 | Sahadevan | G06Q 20/4016 705/44 |
| 2015/0278910 A1 | 10/2015 | Nice et al. | |
| 2016/0042471 A1* | 2/2016 | Barrett | G06Q 20/045 705/30 |
| 2017/0169500 A1 | 6/2017 | Merz et al. | |
| 2018/0011863 A1* | 1/2018 | Xin | H04W 4/18 |
| 2018/0032997 A1* | 2/2018 | Gordon | G06Q 30/0269 |
| 2018/0082251 A1* | 3/2018 | Wilkinson | G06Q 30/0635 |
| 2018/0082352 A1* | 3/2018 | Mattingly | G06Q 10/08 |
| 2018/0082353 A1* | 3/2018 | Mattingly | G06Q 30/0633 |
| 2018/0082356 A1* | 3/2018 | Wilkinson | G06Q 10/083 |
| 2018/0082361 A1* | 3/2018 | Wilkinson | G06Q 30/0639 |
| 2019/0005569 A1* | 1/2019 | Kotha | G06F 16/29 |
| 2019/0340220 A1* | 11/2019 | Larvol | G06F 40/30 |
| 2020/0005385 A1* | 1/2020 | Stout | G06Q 20/322 |
| 2020/0064981 A1* | 2/2020 | Uenohara | G06F 3/0486 |
| 2020/0178706 A1* | 6/2020 | Stout | G07G 1/00 |
| 2020/0234393 A1* | 7/2020 | Kawai | G05D 1/0248 |
| 2020/0372437 A1* | 11/2020 | Kim | G06Q 30/0635 |
| 2020/0372459 A1* | 11/2020 | Woo | G06Q 10/0832 |

FOREIGN PATENT DOCUMENTS

| | | |
|---|---|---|
| CN | 103455937 A | 12/2013 |
| CN | 103823908 A | 5/2014 |
| CN | 104166702 A | 11/2014 |
| CN | 104463637 A | 3/2015 |
| CN | 104732422 A | 6/2015 |
| CN | 105025091 A | 11/2015 |
| CN | 105096151 A | 11/2015 |
| JP | 2001014349 A | 1/2001 |
| JP | 2008283412 A | 11/2008 |

(56) References Cited

FOREIGN PATENT DOCUMENTS

| JP | 2010500647 A | 1/2010 |
| JP | 2011508353 A | 3/2011 |
| JP | 2012221315 A | 11/2012 |
| JP | 2014194724 A | 10/2014 |
| WO | 2014143352 A1 | 9/2014 |

OTHER PUBLICATIONS

Zhao, Xin Wayne, et al. "We know what you want to buy: a demographic-based system for product recommendation on microblogs." Proceedings of the 20th ACM SIGKDD international conference on Knowledge discovery and data mining. 2014. (Year: 2014).*

Decision to Grant a Patent issued in Japanese Application No. 2018530061, available Aug. 20, 2019, with English Translation, 5 pages.

Guangqian et al.: "Research Status and Development Prospects of E-Commerce Recommendation", Journal of Intelligence, Issue 12, 2011 60-65, 21, English abstract only.

Notice of Allowance and Search Report issued in Chinese Application No. 201680081607.4, issued Mar. 23, 2022, with partial English translation, 7 pages.

Office Action and Search Report issued in Chinese Application No. 201680081607.4, issued Oct. 11, 2021, with partial English translation, 21 pages.

Office Action issued in Japanese Application No. 2018530061, available Jun. 11,2019, with English Translation, 6 pages.

PCT International Search Report and Written Opinion, Application No. PCT/US2016/065977, dated Feb. 2, 2017, 12 pps.

Search Report issued in Japanese Application No. 2018530061, available May 29, 2019, with English Translation, 22 pages.

Soboroff, Ian, and Charles Nicholas. "Collaborative filtering and the generalized vector space model." Proceedings of the 23rd annual international ACM SIGIR conference on Research and development in information retrieval. 2000. (Year: 2000).

Yang et al.: "A Collaborative Filtering Post Recommendation Method Integrating PageRank", Journal of University of Science and Technology of China, Issue 7, 2014, 576-581, English abstract only.

Xin Li et al., "MARS: A Multi-Aspect Recommender System for Point-of-Interest", 2015 IEEE 31st International conference on data engineering, IEEE, 2015, pp. 1436-1439.

* cited by examiner

| Algorithm Variation | Leverages User Data | RECOMMENDATIONS | | COMPLEXITY | DEPENDENCE ON METADATA |
| --- | --- | --- | --- | --- | --- |
| | | LOCAL | LONG DISTANCE | | |
| FIRST | 1 | 2 | 1 | 4 | 1 |
| SECOND | 2 | 4 | 2 | 3 | 2 |
| THIRD | 3 | 4 | 3 | 2 | 4 |
| FOURTH | 4 | 4 | 4 | 1 | 4 |

FIG. 10

SYSTEMS AND METHODS FOR GENERATING RECOMMENDATIONS USING A CORPUS OF DATA

CROSS REFERENCE TO RELATED APPLICATIONS

This application is a continuation of and claims priority to U.S. application Ser. No. 17/502,839 filed on Oct. 15, 2021, which is a continuation of and claims priority to U.S. application Ser. No. 15/374,751 filed on Dec. 9, 2016, which claims priority to and the benefit of the filing date of U.S. Provisional Application No. 62/266,419 filed on Dec. 11, 2015, each of which are hereby incorporated by reference in their entirety.

BACKGROUND

This disclosure relates generally to information networks and, more particularly, to computer systems and computer-based methods for generating recommendations and detecting fraudulent behavior based a corpus of data with linked elements.

At least some known recommender systems use historical data to determine preferences of a user, which are then applied to new data to discern potential information in the new data that is of interest to the user. For example, by monitoring financial transaction data from financial transactions of a payment card cardholder, a pattern of cardholder preferences is able to be generated. For example, if an account holder makes frequent purchases at outdoor oriented department stores and fewer purchases at book stores, an inference may be made about the preferences of recreational activities favored by the cardholder. These known recommender systems would tend to provide other outdoor oriented stores to the cardholder when queried in, for example, a new geographic location.

However, providing meaningful recommendations of merchants for a user without a personal profile of preferences for that user is difficult and in some cases, not possible.

BRIEF DESCRIPTION

In one embodiment, a method of recommending a merchant includes receiving financial transaction data documenting financial transactions between a plurality of account holders and a plurality of merchants and generating a merchant correspondence matrix that includes the plurality of merchants and a plurality of indicators of interactions associated with pairs of the plurality of merchants. The plurality of indicators of interactions tally financial transactions conducted by the plurality of account holders at both of the merchants in a pair of the plurality of merchants. The method further includes receiving a query for a recommendation of a merchant from an account holder and generating a ranked list of merchants based on a recommender algorithm. The recommender algorithm inferring user preferences from attributes of the plurality of merchants that were visited by the cardholder.

In another embodiment, a recommender system for recommending a merchant comprises one or more processors communicatively coupled to one or more memory devices. The one or more processors are configured to receive financial transaction data documenting financial transactions between a plurality of account holders and a plurality of merchants and to generate a merchant correspondence matrix that includes the plurality of merchants and a plurality of indicators of interactions associated with pairs of the plurality of merchants, the plurality of indicators of interactions tallying financial transactions conducted by the plurality of account holders at both of the merchants in a pair of the plurality of merchants. The one or more processors are further configured to receive a query for a recommendation of a merchant from an account holder and generate a ranked list of merchants based on a recommender algorithm, the recommender algorithm inferring user preferences from attributes of the plurality of merchants that were visited by the cardholder.

In still another embodiment, one or more non-transitory computer-readable storage media include computer-executable instructions embodied thereon When executed by at least one processor, the computer-executable instructions cause the processor to receive financial transaction data documenting financial transactions between a plurality of account holders and a plurality of merchants and to generate a merchant correspondence matrix that includes the plurality of merchants and a plurality of indicators of interactions associated with pairs of the plurality of merchants, the plurality of indicators of interactions tallying financial transactions conducted by the plurality of account holders at both of the merchants in a pair of the plurality of merchants. The computer-executable instructions further cause the processor to receive a query for a recommendation of a merchant from an account holder and to generate a ranked list of merchants based on a recommender algorithm, the recommender algorithm inferring user preferences from attributes of the plurality of merchants that were visited by the cardholder.

BRIEF DESCRIPTION OF THE DRAWINGS

FIGS. 1-11 show example embodiments of the methods and systems described herein.

FIG. 1 is a schematic diagram illustrating an example multi-party payment card network system having a recommender module.

FIG. 2 is a simplified block diagram of payment card network system including a plurality of computer devices including the recommender module.

FIG. 4 illustrates an example configuration of a user system operated by a user, such as the cardholder shown in FIG. 1.

FIG. 5 illustrates an example configuration of a server system such as server system shown in FIGS. 2, 3A, and 3B.

FIG. 6 is a diagram of a sparse merchant correspondence matrix that may be used with ChangeRank recommender module shown in FIG. 1 displayed as a graph.

FIG. 7 is an illustration of steps performed in recommender module 34.

FIG. 8 is a map of an area that contains the restaurants of merchant correspondence matrix shown in FIG. 7.

FIG. 9 is a merchant correspondence matrix including St. Louis and New York metro areas used to determine recommendations in one metro area based on seeds from a different metro area.

FIG. 10 is a table that evaluates each variation of recommender module 34 across a variety of measures.

FIG. 11 is flow chart of an example method for recommending a merchant.

DETAILED DESCRIPTION

Figure 1:
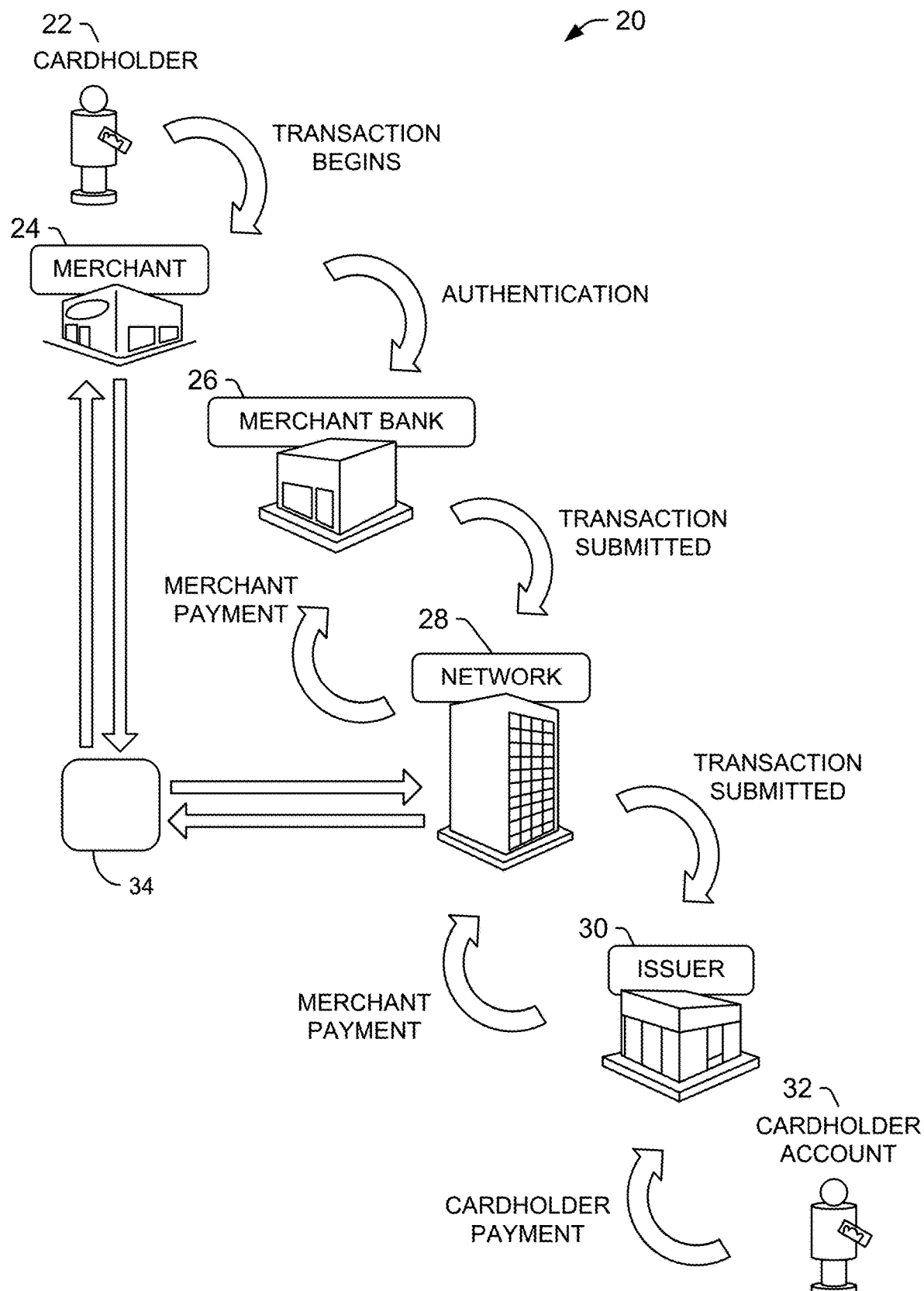

Embodiments of a specially programmed computer module referred to as a ChangeRank module or recommender module 34 is described herein. The ChangeRank module selectively uses one or more of a plurality of specialized algorithms depending on an amount of information accessible or provided to the ChangeRank module. The ChangeRank module uses a matrix of purchases made at a plurality of merchants to generate links between the merchants on the assumption that if one purchaser buys goods at a first merchant and then a second merchant the merchants are related by a preference of the purchaser. The ChangeRank module carries this assumption to hundreds of thousands or millions of transactions and relates the merchants in the transactions to each other using the matrix. The information captured in the matrix can be used to generate merchant recommendations with very little purchaser preference data available. The ChangeRank module can also leverage additional information to improve an accuracy of the recommendations provided in response to a query.

The ChangeRank module is configured to rank merchants based on how customers link them together via purchases using a payment card or similar device. The ChangeRank module provides relevant recommendations even without prior knowledge of a user's preferences by inferring preferences based on merchants frequented by the user. The merchant data is retrieved from financial transaction data made accessible to the ChangeRank module. In addition to providing meaningful recommendations without knowing a user's preferences, ChangeRank is scalable to provide significantly better recommendations based on additional user information received, for example, when a user opts in to permit product data to be included in the available financial transaction data. The user may also explicitly indicate preferences during the query request for recommendations.

The ChangeRank module derives the importance of nodes in a graph based on how they are connected. As used herein, a node is a merchant and an edge measures the number of cardholder co-visits between the merchants that the edge connects.

The ChangeRank module establishes the order of importance of merchants solely on the graph connectivity without any known preferences from the user. Then at the time of a query, only the merchants with matching search terms are returned in an order of their order rank.

In a first embodiment, ChangeRank establishes a rank of merchants, then the user's intent (e.g., "Italian," "family friendly," NYC, etc.) serves as the search query, and then the ChangeRank module returns the matching merchants in order of their rank. This example embodiment of the ChangeRank module is highly scalable, but does not use the user's transaction history in making a recommendation.

In a second embodiment, the ChangeRank module uses an account holder's actual transaction history to directly influence the results (without the abstraction to tags like "Italian," "family friendly," etc.). This embodiment derives personalization based on specific merchants visited and it does not rely on any tagging process in order to make recommendations, however the calculations of the ChangeRank module in this embodiment can be computationally intense. Variations between the first and the second versions of the algorithm permits tailoring the needs of the current recommendation request and that of the computing resources available when the query is made.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of AT&T located in New York, New York). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The following detailed description illustrates embodiments of the disclosure by way of example and not by way of limitation. It is contemplated that the disclosure has general application to processing financial transaction data in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card network system 20 having a recommender module 34. In the example embodiment, recommender module 34 is also referred to as the ChangeRank module. Multi-party payment card network system 20 enables payment card transactions between merchants and cardholders or account holders. Recommender module 34 is a specially programmed computer system that enables merchant location data from the multi-party payment card network system to be used for inferring a user's preferences when the user queries recommender module 34 for a merchant to make a purchase from. Recommender module 34 is specially programmed with a plurality of algorithms that are also configured to receive various amounts of user preference data from the user in the form of query input data, merchant data, and inferred data from other sources of information or communications. The combined data is then used to provide merchant recommendations. In some cases, the user is an account holder that initiates transactions processed by payment card network system 20. In other cases, anyone with access to recommender module 34, through a website or smartphone app can be a user.

Embodiments described herein may relate to a financial transaction card system, such as a payment card network system operated by MasterCard International Incorporated. The payment card network, as described herein, is a four-party payment card network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are customers of the payment card network. As used herein, financial transaction data includes a unique account number associated with an account holder using a payment card issued by an issuer, purchase data representing a purchase made by the cardholder, including a type of merchant, amount of purchase, date of purchase, and other data, which may be transmitted between any parties of multi-party payment card network system 20.

In a typical payment card system, a financial institution called the "issuer" issues a payment card, such as a credit card, to a consumer or cardholder 22, who uses the payment card to tender payment for a purchase from a merchant 24. To accept payment with the payment card, merchant 24 must normally establish an account with a financial institution that is part of the financial payment processing system. This financial institution is usually called the "merchant bank," the "acquiring bank," or the "acquirer." When cardholder 22 tenders payment for a purchase with a payment card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment card network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment card network 28 and/or issuer bank 30 stores the financial transaction data, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment card network 28, and issuer bank 30. More specifically, during and/or after the clearing process, additional data, such as a time of purchase, a merchant name, a type of merchant, purchase information, cardholder account information, a type of transaction, product or service for sale information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment card network 28, and then between payment card network 28 and merchant bank 26, and then between merchant bank 26 and merchant 24.

Payment card network 28 is configured to interface with recommender module 34. Recommender module 34 is configured to receive financial transaction data from payment card network 28 to generate a sparse merchant correspondence matrix. The sparse merchant correspondence matrix includes a list of a plurality of merchants associated with each axis (x-axis and y-axis) of a two dimensional graph. In other words, the same list of merchants is associated with a first axis (e.g., x-axis) and a second axis (e.g., y-axis) of the graph. The intersections of the row and column that include merchants for which there is a covisit will be tallied for each covisit. The graph tabulates pairs of merchants where an account holder has visited both merchants. When only a few covisits are tallied, little information is apparent in the graph. However, as more covisits are determined from the financial transaction data and tallied in the graph, patterns become recognizable and the data becomes more helpful for providing recommendations to the user.

Figure 2:
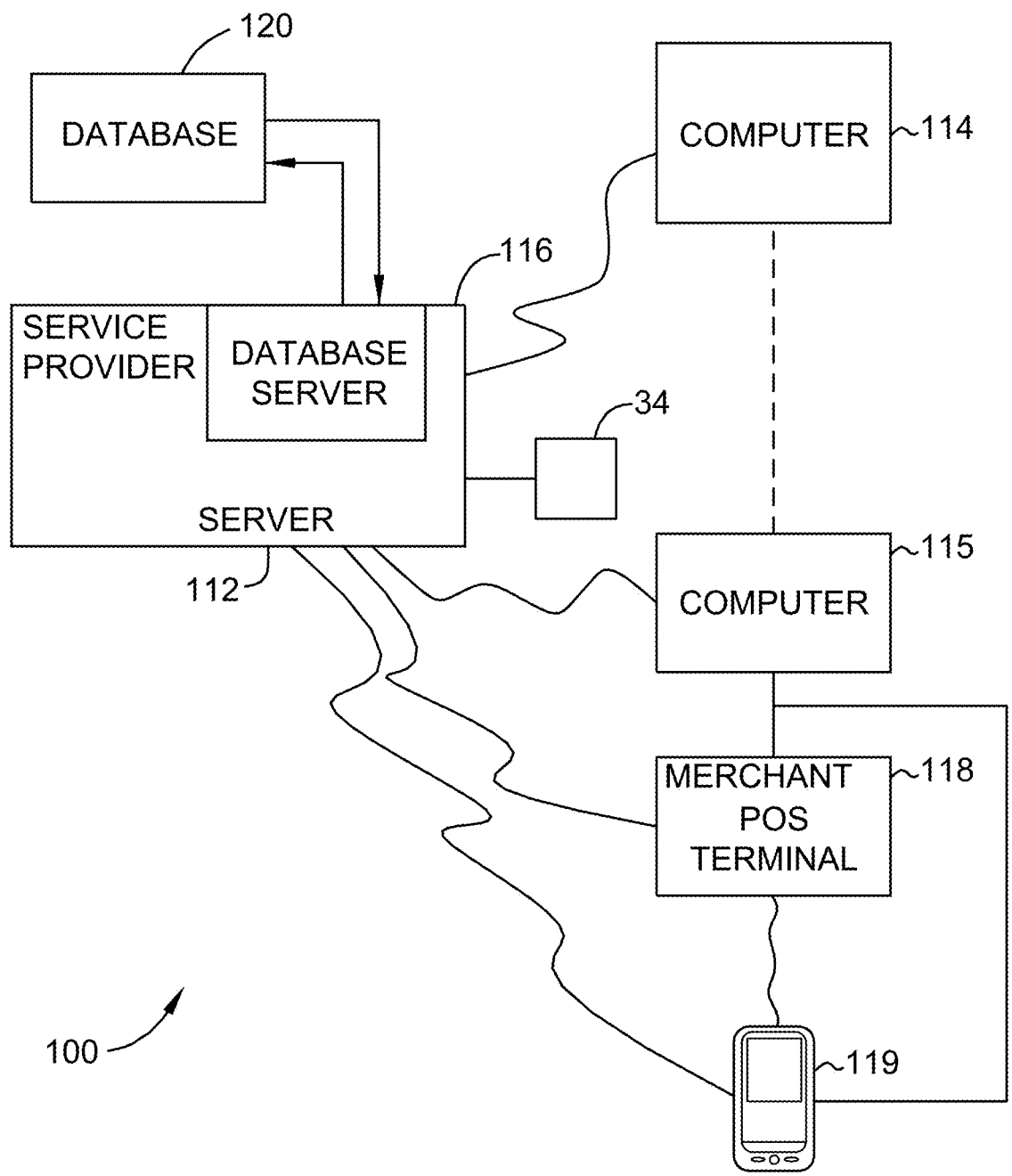

FIG. 2 is a simplified block diagram of an example payment card network system 100 including a plurality of computer devices including recommender module 34. In the example embodiment, the plurality of computer devices includes, for example, server system 112, client systems 114, and recommender module 34. In one embodiment, payment card network system 100 implements a process to generate recommendations of merchant locations. More specifically, recommender module 34 in communication with server system 112 is configured to receive at least a portion of the financial transaction data relating to financial transactions between a plurality of merchants and cardholders or account holders. The financial transaction data includes information about the location of the merchant, and the received at least a portion of the financial transaction data is stored in a memory device.

More specifically, in the example embodiment, payment card network system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

Payment card network system 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of an account holder's name, an account holder's address, a primary account number (PAN) associated with the account holder's name, and other account identifier. Database 120 may also store merchant data including a merchant identifier that identifies each merchant registered to use the network, and instructions for settling transactions including merchant bank account information. Database 120 may also store purchase data associated with items being purchased by an account holder from a merchant, and authorization request data. Database 120 may store picture files associated with the item or service for sale by the merchant user, name, price, description, shipping and delivery information, instructions for facilitating the transaction, and other information to facilitate processing according to the method described in the present disclosure.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by an account holder making an on-line purchase or payment. Server system 112 may be associated with payment card network 28. In the example embodiment, server system 112 is associated with a financial transaction processing network, such as payment card network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment processing system, a biller, and/or a recommender module 34. Recommender module 34 may be associated with payment card network 28 or with an outside third party in a contractual relationship with payment card network 28. Accordingly, each party involved in processing transaction data are associated with a computer system shown in payment card network system 100 such that the parties can communicate with one another as described herein.

Figure 3A:
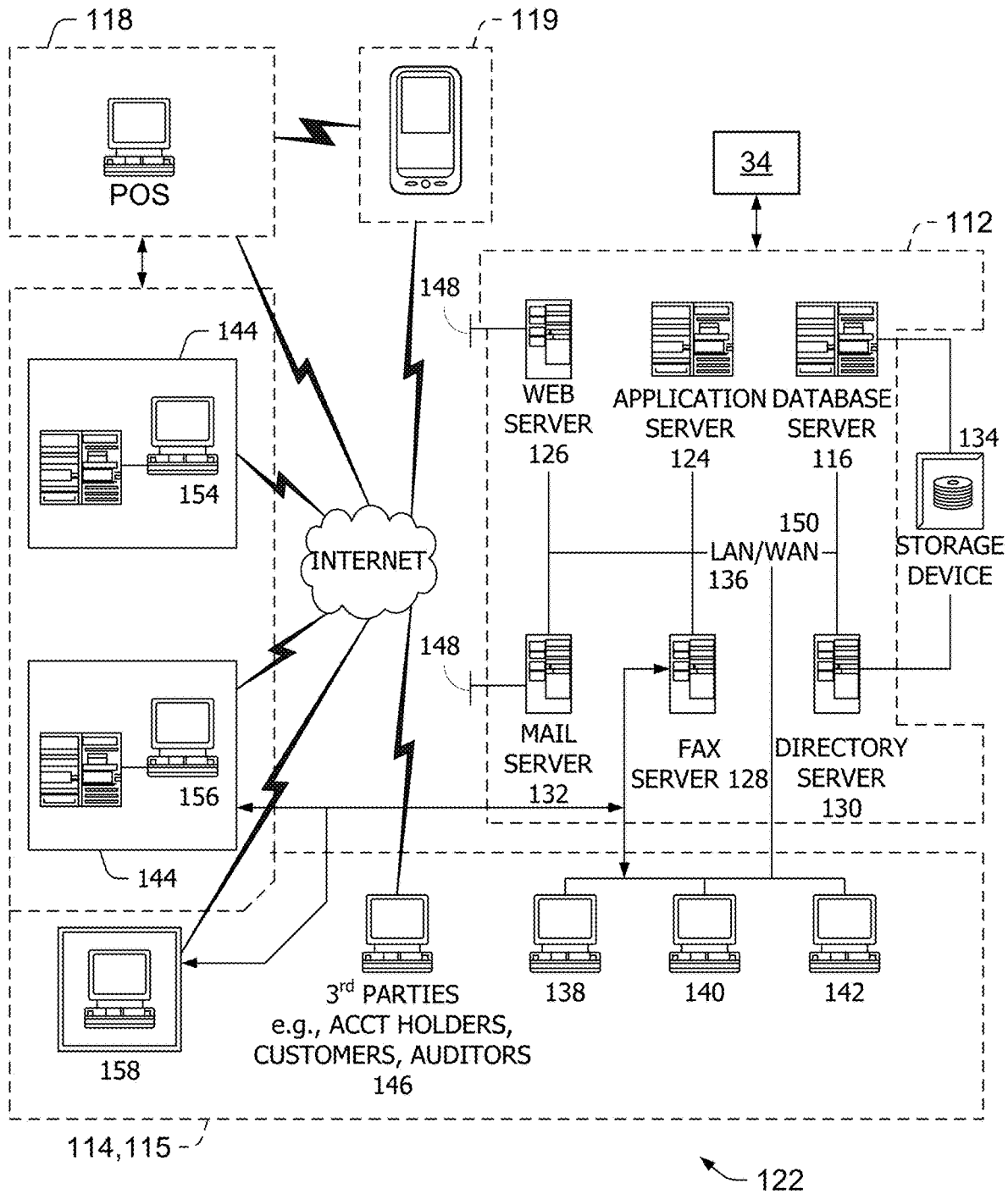
FIG. 3A is an expanded block diagram of an example embodiment of an architecture of a server system of the payment card network system shown in FIG. 1.

FIG. 3A is an expanded block diagram of an example embodiment of an architecture of a server system 122 of payment card network system 100. Components in system 122, identical to components of payment card network system 100 (shown in FIG. 2), are identified in FIG. 3A using the same reference numerals as used in FIG. 2. For example, recommender module 34 is similarly labeled in FIGS. 1, 2, and 3A. System 122 includes server system 112, client systems 114 and 115, POS terminals 118, and at least one input device 119. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to recommender module 34 and various individuals, including client systems (e.g., employees) 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 158 using a telephone link. Fax server 128 is configured to communicate with other client systems 138, 140, and 142 as well.

Figure 3B:
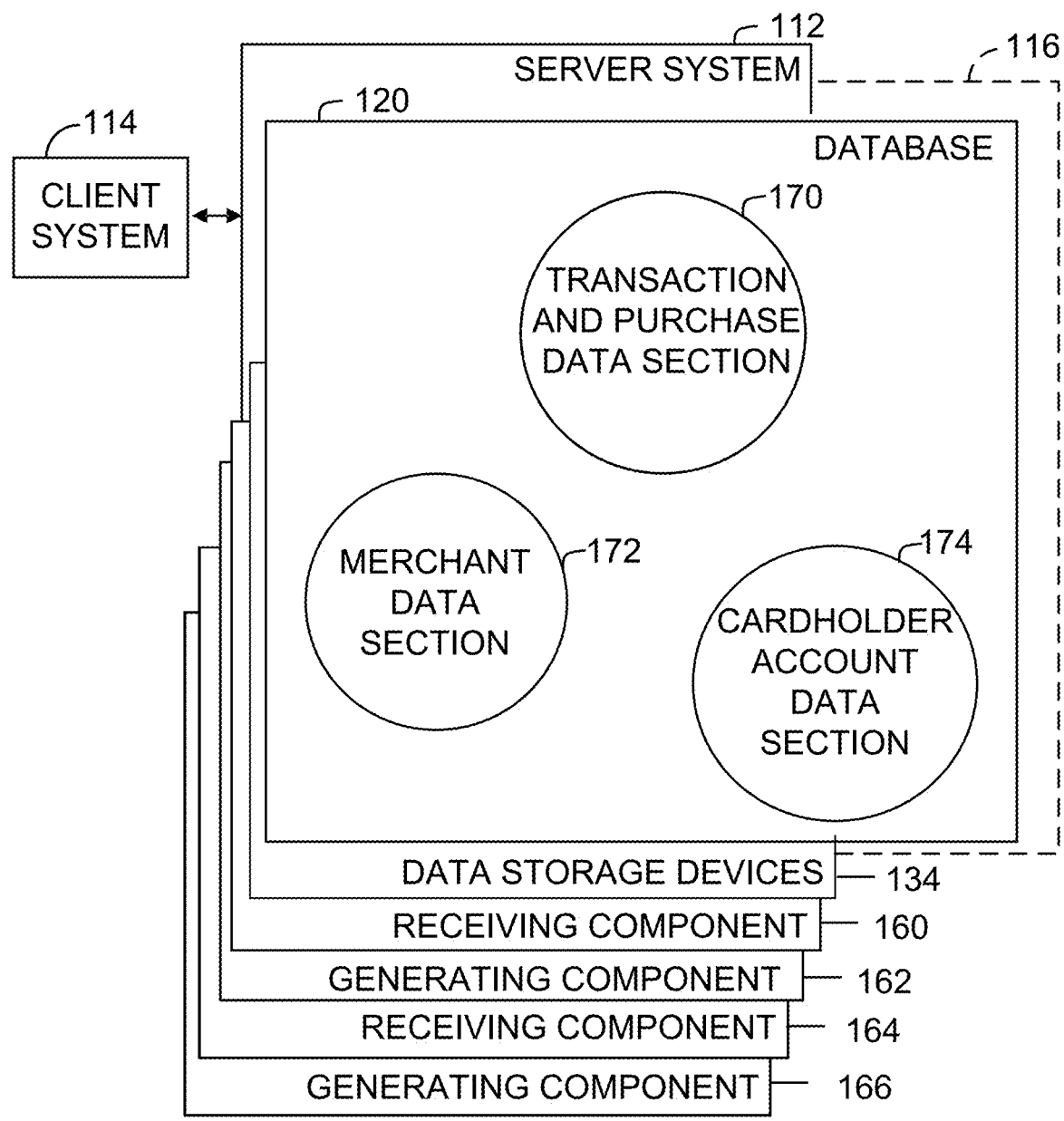
FIG. 3B shows a configuration of the database within the database server of the server system with other related server components.

FIG. 3B shows a configuration of database 120 within database server 116 of server system 112 with other related server components. More specifically, FIG. 3B shows a configuration of database 120 in communication with database server 116 of server system 112 shown in FIGS. 2 and 3A. Database 120 is coupled to several separate components within server system 112, which perform specific tasks.

Server system 112 includes a receiving component 160 for receiving financial transaction data documenting financial transactions between a plurality of cardholders or account holders and a plurality of merchants, a generating component 162 for generating a merchant correspondence matrix that includes the plurality of merchants and a plurality of indicators of interactions associated with pairs of the plurality of merchants, the plurality of indicators of interactions tallying financial transactions conducted by the plurality of cardholders or account holders at both of the merchants in a pair of the plurality of merchants, a receiving component 164 for receiving a query for a recommendation of a merchant from an account holder, and a generating component 166 for generating a ranked list of merchants based on a recommender algorithm, the recommender algorithm inferring user preferences from attributes of the plurality of merchants that were visited by the cardholder.

In an example embodiment, payment card network system 100 includes an administrative component (not shown) that provides an input component as well as an edit component to facilitate administrative functions. Payment card network system 100 is flexible to provide other alternative types of reports and is not constrained to the options set forth above.

In an example embodiment, database 120 is divided into a plurality of sections, including but not limited to, a Transaction and Purchase Data Section 170, a Merchant Data Section 172, and a Cardholder Account Data Section 174. These sections within database 120 are interconnected to update and retrieve the information as required.

Figure 4:
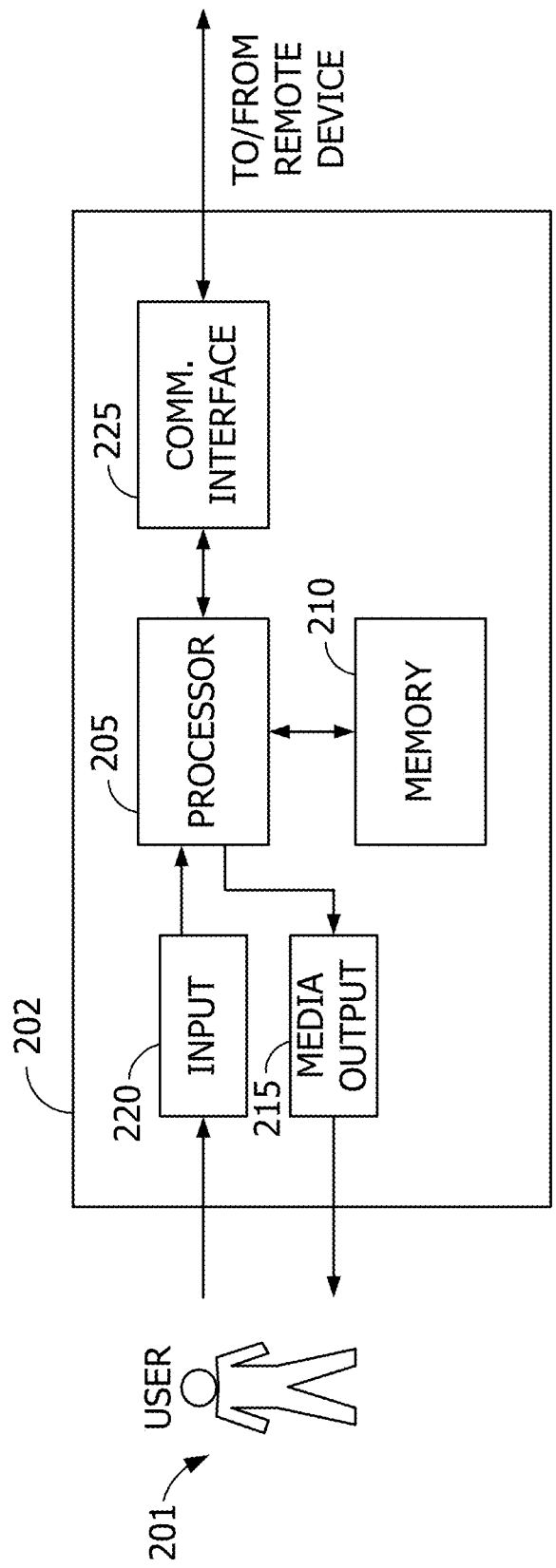

FIG. 4 illustrates an example configuration of a user system 202 operated by a user 201, such as cardholder 22 (shown in FIG. 1). User system 202 may include, but is not limited to, client systems 114, 115, 138, 140, 142, 144, 146, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or other data to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, 4G or Bluetooth or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
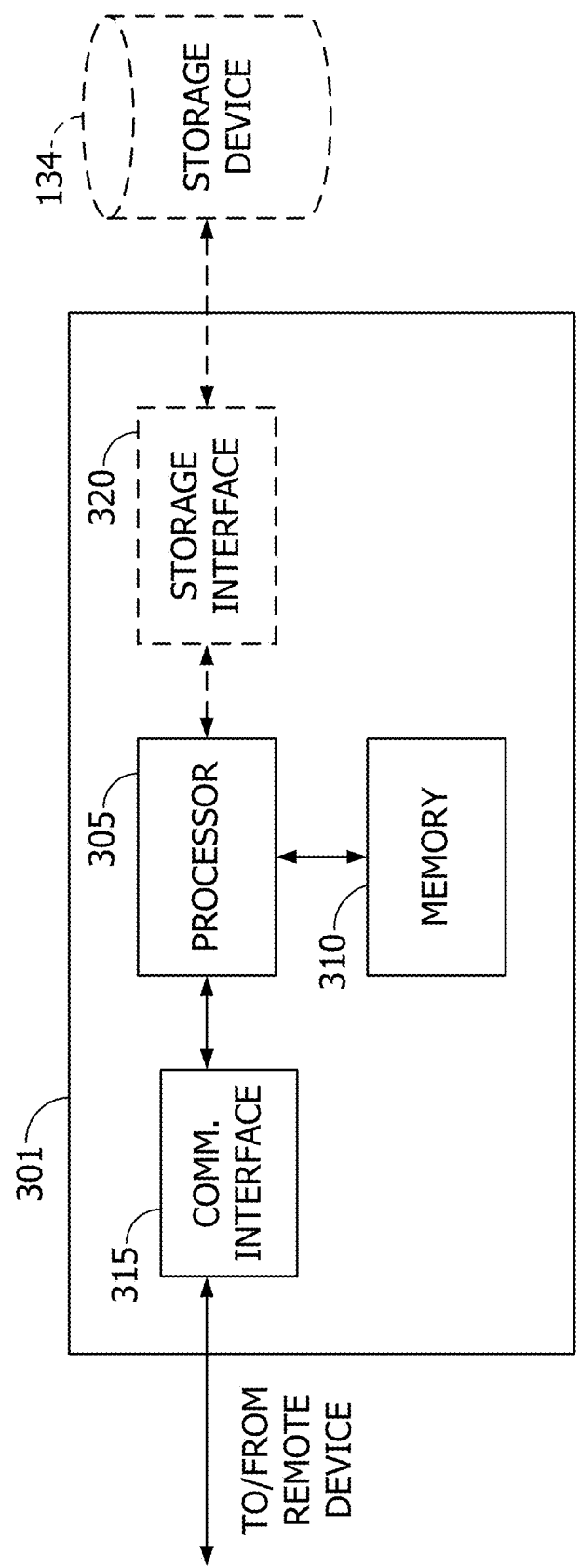

FIG. 5 illustrates an example configuration of a server system 301 such as server system 112 (shown in FIGS. 2, 3A, and 3B). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from client system 114 via the Internet, as illustrated in FIGS. 2, 3A, and 3B.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
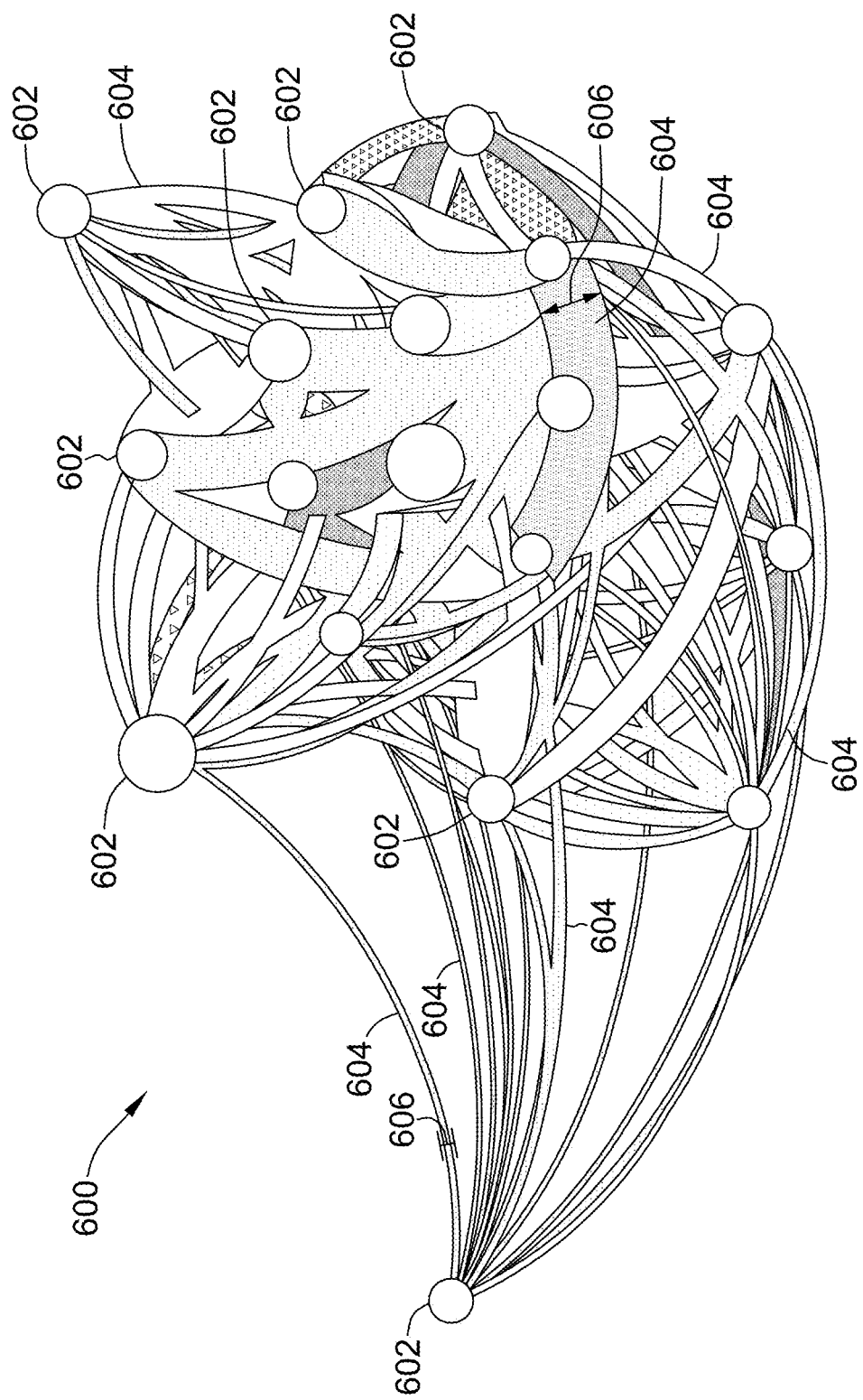

FIG. 6 is a diagram of a sparse merchant correspondence matrix 600 that may be used with ChangeRank recommender module 34 (shown in FIG. 1) displayed as a graph. In sparse merchant correspondence matrix 600, entry (i, j) contains a count of covisits between merchants i and j (shown in FIG. 9). In the example embodiment, the graph of sparse merchant correspondence matrix 600 is derived from restaurants in the St. Louis area with only the highest ranking restaurants being displayed. Each node 602 represents a different restaurant. Each edge 604 represents a connection between two nodes 602. The connection typically represents an account holder that has made a transaction at both connected restaurants or represents a transaction that has been made by a single cardholder. A thickness 606 of each edge 604 represents the frequency of co-visits to the connected restaurants, or a number of customers that have made a transaction at both restaurants or a number of transactions made by the same cardholder at both restaurants. In general, a preference of different cardholders on different restaurants can be inferred and can be used to compute the 'thickness' of the edges. The preference is inferred based on the number of times a cardholder visits a restaurant, adjusted according to other customers of the same restaurant, as well as the cardholder's visits to other restaurants.

Figure 7:
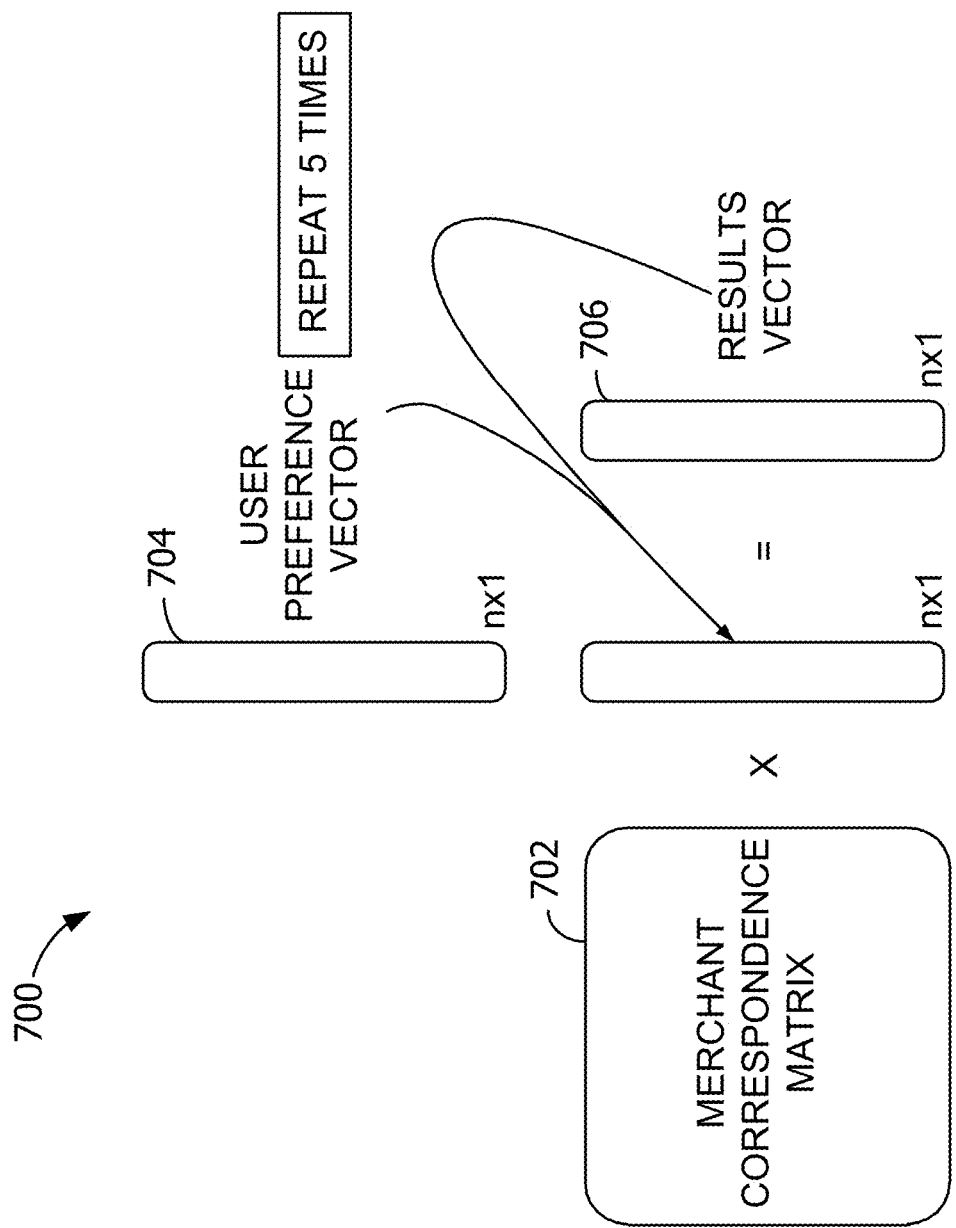

FIG. 7 is an illustration 700 of steps performed in recommender module 34.

There are three main steps to the algorithms used in recommender module 34:
1. Determine the rank of all merchants without any expressed user preferences.
2. Determine the rank of all the merchants with user preferences inferred from the list of specific merchants visited.
3. Compare the results from steps 1 and 2 and return the merchants sorted by decreasing change in rank.

Steps 1 and 2 of the algorithm are accomplished as indicated in FIG. 7. The algorithm starts with merchant correspondence matrix 702 that includes all pairs of represented restaurants, but with a starting value populated in each cell at the intersection of merchant columns and rows (i,j) (shown in FIG. 9). A uniform user preference input vector 704 is used to generate a first results vector 706. An entry i is set to 1 for each implicit or explicit user entry and is normalized. In a second step, each merchant where a transaction occurred is given a greater value in user preference input vector 704.

Visually, Step 2 is equivalent to placing a large amount of activation in the network of merchants at the locations previously visited. Repeating the computations a selectable number of times, for example, five times, has the effect of distributing that activation through the network.

Finally in Step 3, an amount that the activation from the user's transaction history changes the overall rank of each merchant is determined and the merchants with the largest change in rank are returned first.

The method described above is referred to the "iterative" approach; it has the advantage of using less space (i.e., main memory) at the expense of more computation. Let A denote the normalized co-visit matrix where each column sum to 1, $v_0$ denote the initial preference vector (with sum 1), $v_k$ denote the score after the kth iteration, and d denote the damping factor, we have:

$$v_k = dAv_{k-1} + (1-d)v_0 \qquad (1)$$

Damping factor may be selected to be approximately d=0.85. The damping selected affects the score and also affects how fast the iterative method converges.

This calculation of Eq. 1 involves a matrix-vector multiplication, which contributes to the major computation complexity. The multiply-upon-request implementation of this method potentially faces scalability issues due to the size of matrix A and the number of concurrent requests.

Another approach, called the "power" method, pre-computes all paths (out to at least 5 iterations). The power method has the advantage of speed because of a one-time offline pre-computation cost, at the expense of having a full (vs. sparse) matrix. The power method is tractable on merchant sets up to 30,000-50,000 merchants.

Figure 8:
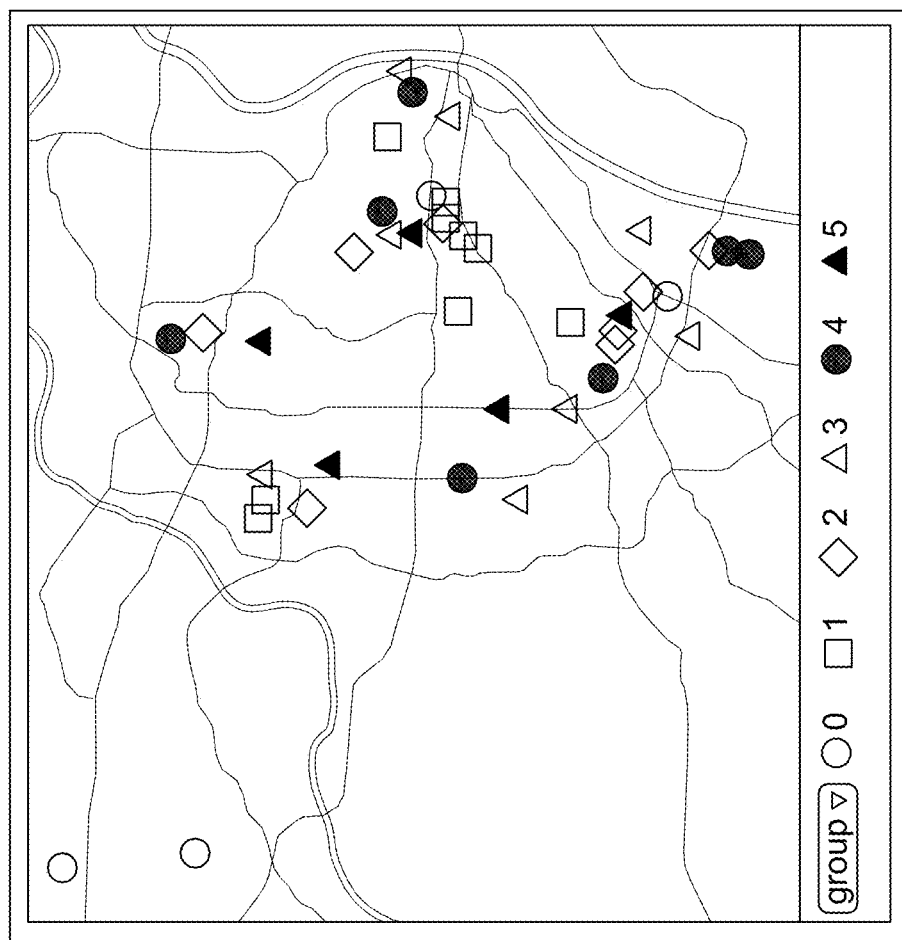

FIG. 8 is a map 800 of an area that contains the restaurants of merchant correspondence matrix 702 (shown in FIG. 7). In the exemplary embodiment, map 800 is of the St. Louis region. For each iteration of recommender module 34 described above, the activation is distributed throughout the network as shown by the icons representing restaurants that are included in each iteration of the algorithm.

Alternate ChangeRank Measures

The two main rank calculation methods include:
1. Rank-based score—a merchant's final ranking is directly proportional to how many slots it climbed due to expressed user preferences versus its original rank position without any user preferences and then scaled by the original ranks.
2. Cumulative energy-based score—instead of basing the score on slot changes as in (1) the final ranking is based on the proportion of rank energy that exists above the given merchant before and after user preferences are factored in, i.e., merchants with higher rank scores may only climb above a few other high-ranking merchants, however, more credit is given based on the "mass" associated with the merchants that were overtaken in the rankings.

The Data Advantage

Recommender module 34 has no parameters to fit, is domain independent, and is therefore completely dependent on the data fed in to make good recommendations. In addition, it does not rely on any meta-data in the process of making a recommendation. As described in more detail below, a financial transaction data element, "history," provides a good first pass filter for the kinds of merchants to be covered by the range of intents in the ChangeRank interface. Recommender module 34 leverages the implicit meta data captured in the merchant correspondence matrix, such as cuisine, cost, geography, etc. The explicit meta data tags are ultimately used for post-filtering the ranked results to fit the user's expressed intent. In the exemplary embodiment, a merchant correspondence matrix was generated using one year of cardholders' financial transaction data for the industry set above for the St. Louis and New York MSA's. Approximately 38,000 merchants are contained in the matrix.

Making Local Recommendations

To demonstrate the ability to make local recommendations two seed sets (or pick lists) were generated and fed into recommender module 34, an inexpensive Italian restaurant seed list and an expensive Italian restaurant seed list.

The map for each set contains groups of merchants, group zero is the seed restaurants. The recommendations are then grouped and colored by each tier, i.e., group 1=top ten, group 2=11-20, etc.

Each seed list generates recommendations that are comparable in quality and cost as the original seed lists, and both sets skew towards Italian. This shows that the algorithm is capitalizing on implicit features captured in the data. The recommendations are not purely driven by proximity to the seed lists.

Figure 9:
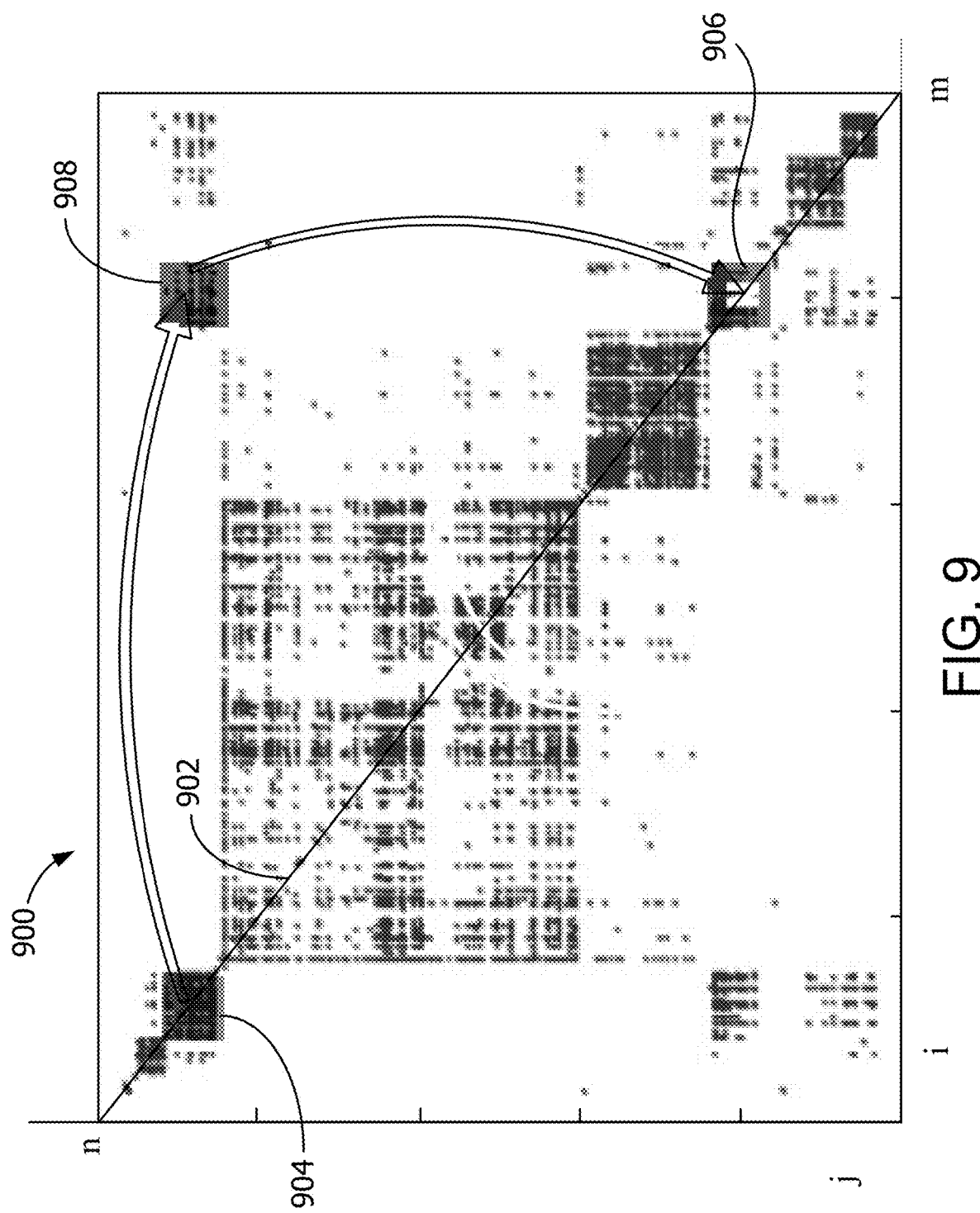

FIG. 9 is a merchant correspondence matrix 900 including St. Louis and New York metro areas used to determine recommendations in one metro area based on seeds from a different metro area. Merchant correspondence matrix 900 illustrates interactions of cardholders with pairs of merchants, where each merchant is represented along a horizontal axis as an $i^{th}$ merchant from i to m merchants and along a vertical axis as a jth merchant from j to n merchants. An interaction is represented as a tally at an (i,j) intersection, which in some embodiments, is represented by a shading of the cell at the appropriate (i,j) intersection.

Making Long Distance Recommendations

The core of recommender module 34 is merchant correspondence matrix 900. A diagonal 902 of merchant correspondence matrix 900 (from top left to lower right) contains blocks of highly connected merchants. These are usually geographic areas, e.g., the sub matrices 904 and 906 are highly connected merchants in the St. Louis and New York areas, respectively. There is also an off-diagonal sub-matrix 908 that corresponds to connections between merchants in the two different geographic areas. These blocks tend to have fewer co-visits and need to be multiplied by a simple "amplification factor" to make long distance recommendations possible.

Long-distance Recommendation Algorithms

In one embodiment, a first, basic amplification algorithm, the counts in the off-diagonal sub-matrices 908 are multiplied by a factor that makes them more proportionate across regions, making it as if the two sets of merchants were in the same area. A second chi-squared amplification is a more statistically rigorous method for setting the amplification factor. A third "regional" vs. micro amplification algorithm set the amplification factor at the merchant level, rather than at the block level.

An example of an application of the long-distance recommendation shows how two sets of seed restaurants in St. Louis can be used to generate personalized recommendations in New York; not only for restaurants, but for other categories of merchants under consideration.

Restaurants like Rigazzi's from the "Inexpensive Italian STL" seed list generate long distance recommendations like Aperitivo in NY; both are mid-level Italian restaurants. On the other hand, restaurants like Trattoria Marcella on the "Expensive Italian STL" seed list lead to NY recommendations like Patsy's Italian Restaurant.

The top five recommended New York hotels for the "Expensive Italian STL" seed list had an average TripAdvisor rating of 4.2, and an average room rate of $589/night. Whereas for the "Inexpensive Italian STL" seed list, the average TripAdvisor rating for the top five was 4.0, with an average cost of $177/night.

Fitflop USA produces affordable comfort shoes like sandals and clogs, with a brick- and mortar location in White Plains, NY. In the "high-end Italian STL" seed group, this store ranked 214th; however, in the "Inexpensive Italian STL" seed group, this merchant makes its way into the 12th slot.

The Vineyard Theater and Workshop Center is the self-proclaimed "home for bold theatre" in NYC. This merchant ranked #2 for the "high-end Italian STL" seed group, and #57 for the "Inexpensive Italian STL" seed group. Ticket prices appear to be a driving factor.

A simple implementations of recommender module 34 can be unnecessarily complicated because the simple implementation simultaneously makes predictions for all possible destination areas. The overwhelming majority of recommendation requests are likely to be local to the spending patterns used for the seed data. Variations of the algorithm can be selected that trade off the computational complexity with the quality of the rankings and the need for external merchant meta data. Below are four variations of the algorithm that range from simple to complex.

As described above, the simplest and most scalable way in which financial transaction data can be leveraged would be to just perform Step 1 of the algorithm and generate the overall rank of all merchants in a first approach. Then the user's intent, (e.g., "Italian," "family friendly," NYC), would be used to filter down the final recommendations. When the overall rank values have been generated as a part of an earlier query, they could be directly applied for the NY and STL areas. Although this first approach uses financial transaction data for the merchant correspondence matrix, it does not use cardholder specific data to make personalized recommendations.

A first variation of the algorithm tends to scale well when a user requests recommendations that are local to their observed transaction behavior. The first variation of the algorithm would be to use the pure algorithm for local recommendations (either using sub-matrices fed into the iterative method or the power method outlined above), and for long-distance recommendations we can use the first approach described above. This first variation has the advantage of personalization based on cardholder behavior for a majority of recommendation requests. The main drawback is that long-distance recommendations are not as relevant as they could be.

A second variation of the algorithm that helps with long-distance scalability is the two-step cross-region approach. Although the algorithm, especially the amplification step, is designed to perform cross-region recommendation directly, the two-step cross-region recommendation improves the performance of the algorithm. In the second variation seed or preferred merchants percolate for a small number of iterations in the source region and the most active merchants in the source region then connect to seeds in the destination region where local recommendations are then computed. In other words, for performing a cross-region recommendation (e.g., St. Louis seeds for New York City recommendation), the top recommendations in the target location are noted and used to perform a second step of local recommendation.

For improved scalability, it is not desirable to use an overly large, for example, a one million by one million matrix for recommendations. In addition to the computational complexity, improper scaling of off-diagonal blocks can significantly impact even the local recommendations. Provided that in almost all use cases, at most two regions will be used, co-visit matrices for pairs of regions are used to perform the recommendation.

Long distance recommendations can be made using only a small portion of the merchant correspondence matrix, the MSA for the seed list, the MSA for the destination, and the links between the two MSA's. This third variation has the advantage of true personalization for all queries, with the expense of working on a large part of the merchant correspondence matrix. The selection of the relevant portions of the merchant correspondence matrix can be accomplished by a pre-multiplication step.

Using pairs of regions, it is possible to use a few metro areas as hubs or hub cities for cross-region recommendation. The hub cities are analogous to hub cities in an airline context. Similarly as to how difficult it is to fly from one city to another directly, it may be difficult to generate a recommendation for one city using seed data from a particular seed city. It may be difficult because there is lesser correlation between the two cities. In such a case, a two step recommendation process using an intermediate hub city or region may improve the recommendation. For example, if a recommendation is needed for the top twenty metro areas in the United States, five metro areas can be selected based on geographical locations as hubs. Each of the fifteen remaining areas paired with each hub, resulting in a total of 15*5=75 pairs. In addition, pairs are generated among the hubs. A total of 85 pairs are used, instead of =190 pairs without using the hubs. The number can be further reduced if each remaining city is paired with only one hub, in which case 15+10=25 pairs will be used. The extreme case is to use only one hub and create a total of 19 pairs. The multi-region recommendation is performed in the form of:

(origin city)—(hub city)—[optional another hub city]—(destination city)

where in each transfer, the top K recommendations are used as the seed for the next round.

A different approach is to maintain a local co-visit matrix for each metro area, and use them for local recommendations. For multi-region recommendations, select a 'reasonable' subset of merchants based on the inter-region connections and other measures, including centrality, pagerank scores etc. Then that subset of merchants from multiple regions can be used to generate seeds for cross-region recommendations, and then the seeds are plugged into the local recommendation engine for the target location.

The fourth variation is as described above where the algorithm establishes the order of importance of merchant solely on the graph connectivity without any known preference from the user. Then at the time of the query, only the pages with matching search terms are returned in order of their rank. This variation of the algorithm makes simultaneous recommendations for all merchants, which in many cases is unnecessary and infeasible.

An example showing a recommendation for New York City restaurants using St. Louis favorites decomposes the original multi-region co-visit matrices and then performs the cross-region recommendation. Using St. Louis picks, create a preference vector for the St. Louis restaurant market only. Determine a resulting pagerank score using the submatrix for only the St. Louis restaurants. Using the sub-matrix for New York City and St. Louis restaurants calculate a preference vector for New York City restaurant market. Use the generated New York City preference vector to perform local recommendation for New York City using the sub-matrix for only New York City restaurants. The second step involves obtaining a reasonable preference vector, v_STL using the NYC-STL sub-matrix, which corresponds to a bipartite graph between NYC and STL restaurants. A simple and straightforward approach is to perform a one-step walk from the STL part of the matrix to the NYC part of the matrix. First normalize the columns of matrix B to have sum 1. Then generate the NYC preference vector using:

$$v\_NYC = Bv\_STL$$

The immediate benefit of this method is that no cross-region matrix amplification is required. Also, depending on how the preference vector for target city is generated, it may not be necessary to perform the first step.

FIG. 10 is a table 1000 that evaluates each variation of recommender module 34 across a variety of measures. Although one variation may not be optimal for all queries, the variations may be selectable either by the user or automatically depending on limiting criteria, such as, but not limited to computing availability, network speed, etc.

Each measure is listed across a header row 1002. A first measure 1004 relates to an assessment of how well each variation leverages user data in its execution. The values 1-4 indicate which variation is least desirable (1) to use for the measure and which variation is most desirable (4) for the measure. In this case, the fourth variation, sometimes referred to as the "pure" variation, is best when considering how well each variation leverages user data in its execution. Similarly, a second measure 1006 indicates that any of the second, third and fourth variations are most desirable when the local recommendation performance of the variations is considered. Similarly indications for a long distance measure 1008, a complexity measure 1010 of the algorithm in each variation, and a dependence on meta-data measure 1012 are also shown.

Personalization Controls
Obtaining User Preferences

In one embodiment, a cardholder registers a payment card PAN to obtain a user history from the various industry codes for which recommendations are generated. However, other methods exist, for example, the user can select a list of favorites from a specified (i.e., home) region using an expression-type search. The user preference vector is then populated from this list. A discovery preference sentence may be expanded to include the selection of cuisine(s) from a list. The user preference vector could be populated by selecting all restaurants from the chosen cuisine(s). If no preferences are obtained, then the algorithm can proceed to make recommendations with an unbiased user input vector, effectively reverting to the first variation of all restaurants filtered according to location and the discovery preference sentence.

Weighting User Preferences

There are two ways in which a user's specified preferences can be weighted for more or less personalization.

1. User input vector modification. The default configuration give J/(J+1) percent of the user input weight to the J preferred/visited merchants specified; the other 1/(J+1) percent is distributed out amongst the remaining merchants. In fact, the numerator could range from 0 to J+1 where 0 is purely exploratory (and corresponds to the third variation described above), and J was chosen so that preferences would be given strong weight, but that all merchants are assigned a rank; and J+1 is purely exploitive and biases the results heavily towards the users' favorites.

2. Number of iterations in the main loop. The default configuration is to run the main loop a predetermined number of times, for example, but not limited to, five times. Empirically, after five iterations, a user's preferences propagate to the outer reaches of the network, and the highest rankings begin to converge. The number of iterations could span from 0 to any positive integer (or some convergence criteria is met), where 0 completely ignores the user's preferences/history and is equivalent to a zero "User input vector modification" described above, or in other words is just the ordinary ChangeRank module; and 5 is the ideal tradeoff between strong personalization and scalability. Some larger number of iterations or convergence criteria could also be selected based on other criteria. Both methods range from zero (no personalization) to some maximum value (maximum personalization). This range is sometimes referred to as the explore vs. exploit tradeoff. It should be noted that an exact solution can be pre-computed, which would be an equivalent calculation to infinite iterations. Such a pre-computation uses a significant amount of computing resources, but can only be done periodically to conserve resources, rather than for each recommendation request.

Pre-Filtering for User Intent

Another form of pre-filtering is geographic filtering. When a user has a designated destination and a known region for their preferences, the algorithm can prune all other geographic regions from the merchant correspondence matrix for the sake of minimizing calculations, as well as causing the recommendations to be more directly connected to the source preference list.

Post-Filtering for User Intent

Recommender module 34 interface captures user intent by completing the following "Discovery" sentence:

"I am with option 1 and I want to option 2 with prices that are option 3 in a place that is option 4." In each blank, a selectable option is presented to the user. For example, for option 1, a user may select such choices as, "me," a "friend," a "colleague," a "spouse," and the like. Option 2 may present choices such as "explore" and "exploit" to capture the adventuresomeness of the user at that time. Option 3 may present choices such as, "cheap," inexpensive, and "expensive." Option 4 may include choices such as, "a local favorite," "an obscure location", "romantic" and "raucous."

Enforcement of the user's intent is accomplished by filtering the resulting list of merchant recommendations. Each table below corresponds to a part of the sentence and contains a proposed method for filtering for that portion of the sentence:

For "I am with . . . " the acquired or inferred merchant meta data is leveraged by mapping all of the merchant property tags, e.g., "family friendly", "good for groups", "outdoor dining", etc. to each of the possible choices. For example, "outdoor dining" would be a tag that maps to "My Date"

TABLE 1

| I am with | Enforce with merchant/event/ location meta data tags |
|---|---|
| Myself | Y |
| My Family | Y |
| My Date | Y |
| My Friend | Y |
| My Kids | Y |
| My Dog | Y |

For the "and want to . . . " portion can be determined by assigning the industry codes used in forming the merchant correspondence matrix to each of the possible responses as shown in Table 2

TABLE 2

| and want to | Enforce with Industry code |
|---|---|
| Explore | ACC, LEE, ARA (select museums), TAT, TET |
| Eat | EAP minus fast food |
| Play | ARA, ART, BTN, CGA, LEE, MER, MOT, PST, VGR |
| Shop | AAC, AAF, AAM, AAW, AAX, GHC, GSF, SHS, TOY |

TABLE 3

| INDUSTRY CODE | INDUSTRY NAME |
|---|---|
| ACC | Accommodations |
| ARA | Amusement, Recreation activities |
| ART | Arts and Craft Stores |
| BTN | Bars/Taverns/Nightclubs |
| CGA | Casino and gambling activities |
| EAP | Eating Places |
| GHC | Giftware/Houseware/Card Shops |
| GSF | Specialty Food Stores |
| LEE | Live Performances, events, exhibits |
| MER | Miscellaneous entertainment and recreation |
| MOT | Movie and other theatrical |
| MPS | Miscellaneous professional services |
| PHS | Photography Services |

To handle the "with prices that are . . . " portion of the sentence, uses two steps:
1) for each merchant or industry code compute the high/medium/low breakpoints where "high" is in the top 20%, "medium" is in the middle 20-80%, and "low" is in the bottom 20%.
2) map the available user history by merchant into each of the three categories high/medium/low and capture the most frequent level of spend

TABLE 4

| With prices that are . . . | Enforce with inferred attributes | Comment |
|---|---|---|
| Reasonable | Y | Normalize by merchant or industry code, e.g., assign each industry code like SHS a High (top 20%), Medium (20%-80%), and Low (bottom 20%) value. |
| What I normally spend | Y | Need off-line batch job for registrants to measure by merchant or industry how often they spend in the High/Medium/low merchants as described above. |
| Not an issue | N | |

The "in a place that is . . . " portion of the sentence can be managed using attributes appended at the merchant level. There is an existing "local favorite" definition that may either be reused or reinvented; the "popular" option would be a pass-through of the merchant recommendations; and the "new establishment" portion may be supported by the "begin_date" field in the data warehouse, but some continuity issues may arise and require manual intervention. For example, if a merchant changes acquirers a new location id may be generated; the existing scrubbing processes attempt to match the new location to the original and retain the original begin_date. However, there are times when a manual review may be needed.

TABLE 5

| In a place that is . . . | Enforce with appended attributes |
|---|---|
| A Local Favorite | Y |
| Popular | Y |
| A New Establishment | Y |

Figure 11:
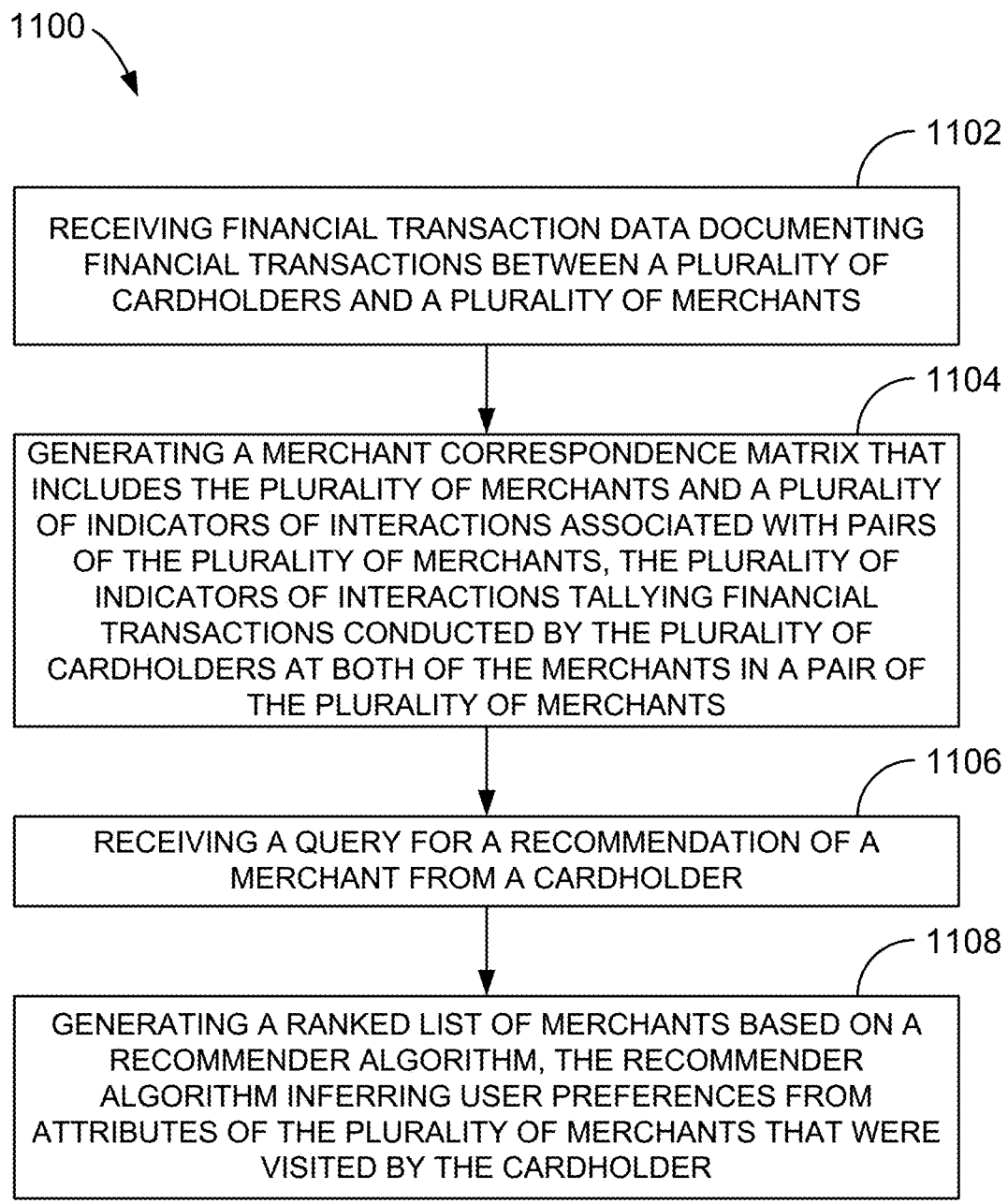

FIG. 11 is flow chart of an example method 1100 for recommending a merchant. Method 1100 is implemented using a computer device coupled to a memory device. Method 1100 includes receiving 1102 financial transaction data documenting financial transactions between a plurality of cardholders or account holders and a plurality of merchants and generating 1104 a merchant correspondence matrix including the plurality of merchants and a plurality of indicators of interactions associated with pairs of the plurality of merchants. The plurality of indicators of interactions tally financial transactions conducted by the plurality of cardholders or account holders at both of the merchants in a pair of the plurality of merchants. Method 1100 further includes receiving 1106 a query for a recommendation of a merchant from an account holder and generating 1108 a ranked list of merchants based on a recommender algorithm, the recommender algorithm inferring user preferences from attributes of the plurality of merchants that were visited by the cardholder.

Described herein is a computer-based method for recommending a merchant to a cardholder based on the cardholder's historical purchasing pattern or detecting a fraudulent transaction with a merchant based on the transaction being outside the historical purchasing pattern or based on the transaction matching a known fraudulent pattern. The method is implemented using a recommender computer device coupled to a memory device. The recommender computer device is communicatively coupled to a user computer device and a payment processor through a network. Additionally, a matrix processor, which may be a separate data structure stored on a separate data storage and retrieval device, is also communicatively coupled to the payment processor through the network or through a private network, such as, but not limited to a LAN. The method includes receiving financial transaction data documenting financial transactions between a plurality of account holders and a plurality of merchants. In one embodiment, the financial transaction data is received by the recommender computer device from the payment processor over the network. In other embodiments, the matrix processor receives the financial transaction data directly from the payment processor.

The method also includes generating a merchant correspondence matrix that includes the plurality of merchants and a plurality of indicators of interactions associated with pairs of the plurality of merchants. The plurality of indicators of interactions is used to tally financial transactions conducted by the plurality of account holders at both of the merchants in at least one of the pairs of the plurality of merchants. A visual result of such a tallying of interactions is shown in FIG. 9. A plurality of merchants are represented along each of the axes of the matrix and interactions that the account holder has with two merchants is tallied at the intersection of those two merchants as found in the column representing one merchant and the row indicating the second merchant. For each interaction from all the account holders at those two merchant the cell at the intersection is incremented. The tally then can be used in a recommender or fraud detection scheme as an indication of tying together merchants the account holder is likely to use. The tally can be used in a recommender system or a fraud detection scheme as an indication of an account holder purchasing pattern. Additionally, when financial transaction data is received that is outside the historical pattern, the financial transaction data can be compared to known fraud models to find particular patterns of fraudulent transaction that can facilitate confirming a fraudulent transaction. For example, a known pattern for fraudulent transactions may include out of pattern purchases for small expensive easily convertible products, such as, but not limited to jewelry or electronics products. If an account holder with a particular pattern that indicates jewelry purchases are a rarity is noticed making an out of pattern purchase at a jewelry merchant, the recommender computer device may alert the payment processor and/or account holder to the potentially fraudulent transaction.

The method also includes receiving a query for a recommendation of a merchant from an account holder or other user. Typically the account holder or another user, for example, a non-account holder that is using the recommender computer device as a service, requests a recommendation for a merchant for a particular product or service. The recommender computer device or recommender module generates a ranked list of merchants based on inferred user preferences from attributes of the plurality of merchants that were visited by the account holder. The recommender computer device or recommender module may also respond to a query regarding a potentially fraudulent transaction to determine a likelihood that the transaction is fraudulent.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processor 205, 305 wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. The technical effect of the methods and systems may be achieved by performing at least one of the following steps: (a) receiving a first corpus of first data, the first data includes an indicator of an interaction between a first element of the first corpus of first data and a second element of the first corpus of first data; (b) generating a first matrix that correlates the interactions between the first element and the second element; (c) receiving a second corpus of second data, the second data includes an indication of an interaction between a third element of the second corpus of second data and a fourth element of the second corpus of data; (d) generating a second matrix that correlates the interactions between the third element and the fourth element; and (e) generating a third matrix by merging the first matrix and the second matrix using a key defined by the interactions between the first and second elements and the interactions between the third and fourth elements.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A preference predictor system comprising at least one processor coupled to a memory device, the memory device comprising instructions executable to cause the at least one processor to:

access a database storing communications routed by a payment card network between a plurality of acquirer computing devices and a plurality of issuer computing devices, each of the communications formatted according to a standard for exchange of financial transaction data and settlement of funds between financial institutions that are customers of the payment card network, each of the communications corresponding to a transaction between a respective one of a plurality of merchants and a respective one of a plurality of users, each of the communications including data identifying the respective merchant and an account of the respective user;

generate, in the memory device for a first list of merchants of the plurality of merchants, an array of values (i, j) corresponding to a merchant correspondence matrix, wherein the first list comprises an ordered sequence of merchants numbered 1 to n, i and j are indices, the index i ranges from 1 to n, and the index j ranges from 1 to n, the generating comprising:

identifying transactions associated with the merchants in the first list;

identifying, from communications associated with the identified transactions, accounts that transacted at each merchant in the first list; and populating, in the memory device, each of the values (i, j) of the array based on a number of co-visits of merchant i and merchant j;

multiply the merchant correspondence matrix and a uniform preference vector to obtain a first results vector;

determine an initial rank of each merchant in the first list based on the values in the first results vector;

identify, from communications associated with a first account associated with a first user of the plurality of users, each merchant in the first list at which the first account transacted;

generate a user preference vector for the first account;

receive, from a client computing device via the Internet, a query from the first user for a recommendation of a merchant;

generate a second results vector, comprising multiplying, by the at least one processor, the merchant correspondence matrix and the user preference vector;

determine an updated rank of each merchant in the first list based on the values in the second results vector;

predict a ranked preference of the first user for merchants in the first list based on a change in rank of the merchants in the first list between the initial rank and the updated rank; and identify and transmit, to the client computing device via the Internet, one or more merchants of the first list based on the predicted ranked preference.

2. The preference predictor system of claim 1, wherein the instructions are further executable to cause the at least one processor to search data identifying a respective merchant of the plurality of merchants identify the transactions associated with the merchants in the first list.

3. The preference predictor system of claim 1, wherein each co-visit is defined as a respective one of the identified accounts having at least one of the identified transactions at merchant i and at least one of the identified transactions at merchant j.

4. The preference predictor system of claim 1, wherein the instructions are further executable to cause the at least one processor to receive, from the client computing device via the Internet, a registration from the first user.

5. The preference predictor system of claim 1, wherein the instructions are further executable to cause the at least one processor to identify transactions associated with the first account by searching data identifying the first account.

6. The preference predictor system of claim 1, wherein the user preference vector comprises n elements, wherein elements corresponding in sequence to one of the visited merchants are weighted heavier than the elements of the user preference vector that do not correspond to one of the visited merchants.

7. A computer-implemented method implemented using a preference predictor system including at least one processor coupled to a memory device, the method comprising:

accessing a database storing communications routed by a payment card network between a plurality of acquirer computing devices and a plurality of issuer computing devices, each of the communications formatted according to a standard for exchange of financial transaction data and settlement of funds between financial institutions that are customers of the payment card network, each of the communications corresponding to a transaction between a respective one of a plurality of merchants and a respective one of a plurality of users, each of the communications including data identifying the respective merchant and an account of the respective user;

generating, in the memory device for a first list of merchants of the plurality of merchants, an array of values (i, j) corresponding to a merchant correspondence matrix, wherein the first list comprises an ordered sequence of merchants numbered 1 to n, i and j are indices, the index i ranges from 1 to n, and the index j ranges from 1 to n, the generating comprising:

identifying transactions associated with the merchants in the first list;

identifying, from communications associated with the identified transactions, accounts that transacted at each merchant in the first list; and populating, in the memory device, each of the values (i, j) of the array based on a number of co-visits of merchant i and merchant j;

multiplying the merchant correspondence matrix and a uniform preference vector to obtain a first results vector;

determining an initial rank of each merchant in the first list based on the values in the first results vector;

identifying, from communications associated with a first account associated with a first user of the plurality of users, each merchant in the first list at which the first account transacted;

generating a user preference vector for the first account;

receiving, from a client computing device via the Internet, a query from the first user for a recommendation of a merchant;

generating a second results vector, comprising multiplying, by the at least one processor, the merchant correspondence matrix and the user preference vector;

determining an updated rank of each merchant in the first list based on the values in the second results vector;

predicting a ranked preference of the first user for merchants in the first list based on a change in rank of the merchants in the first list between the initial rank and the updated rank; and identifying and transmitting, to the client computing device via the Internet, one or more merchants of the first list based on the predicted ranked preference.

8. The computer-implemented method of claim 7 further comprising searching data identifying a respective merchant of the plurality of merchants identify the transactions associated with the merchants in the first list.

9. The computer-implemented method of claim 7, wherein each co-visit is defined as a respective one of the identified accounts having at least one of the identified transactions at merchant i and at least one of the identified transactions at merchant j.

10. The computer-implemented method of claim 7 further comprising receiving, from the client computing device via the Internet, a registration from the first user.

11. The computer-implemented method of claim 7 further comprising identifying transactions associated with the first account by searching data identifying the first account.

12. The computer-implemented method of claim 7, wherein the user preference vector comprises n elements, wherein elements corresponding in sequence to one of the visited merchants are weighted heavier than the elements of the user preference vector that do not correspond to one of the visited merchants.

13. At least one non-transitory computer-readable storage medium having computer-executable instructions embodied thereon for execution by at least one processor of a preference predictor system, the at least one processor in communication with a memory device, the computer-executable instructions executable to cause the at least one processor to:
  access a database storing communications routed by a payment card network between a plurality of acquirer computing devices and a plurality of issuer computing devices, each of the communications formatted according to a standard for exchange of financial transaction data and settlement of funds between financial institutions that are customers of the payment card network, each of the communications corresponding to a transaction between a respective one of a plurality of merchants and a respective one of a plurality of users, each of the communications including data identifying the respective merchant and an account of the respective user;
  generate, in the memory device for a first list of merchants of the plurality of merchants, an array of values (i, j) corresponding to a merchant correspondence matrix, wherein the first list comprises an ordered sequence of merchants numbered 1 to n, i and j are indices, the index i ranges from 1 to n, and the index j ranges from 1 to n, the generating comprising:
    identifying transactions associated with the merchants in the first list;
    identifying, from communications associated with the identified transactions, accounts that transacted at each merchant in the first list; and
    populating, in the memory device, each of the values (i, j) of the array based on a number of co-visits of merchant i and merchant j;
  multiply the merchant correspondence matrix and a uniform preference vector to obtain a first results vector;
  determine an initial rank of each merchant in the first list based on the values in the first results vector;
  identify, from communications associated with a first account associated with a first user of the plurality of users, each merchant in the first list at which the first account transacted;
  generate a user preference vector for the first account;
  receiving, from a client computing device via the Internet, a query from the first user for a recommendation of a merchant;
  generate a second results vector, comprising multiplying, by the at least one processor, the merchant correspondence matrix and the user preference vector;
  determine an updated rank of each merchant in the first list based on the values in the second results vector;
  predict a ranked preference of the first user for merchants in the first list based on a change in rank of the merchants in the first list between the initial rank and the updated rank; and
  identify and transmit, to the client computing device via the Internet, one or more merchants of the first list based on the predicted ranked preference.

14. The at least one non-transitory computer-readable storage medium of claim 13, wherein the computer-executable instructions are further executable to cause the at least one processor to search data identifying a respective merchant of the plurality of merchants identify the transactions associated with the merchants in the first list.

15. The at least one non-transitory computer-readable storage medium of claim 13, wherein each co-visit is defined as a respective one of the identified accounts having at least one of the identified transactions at merchant i and at least one of the identified transactions at merchant j.

16. The at least one non-transitory computer-readable storage medium of claim 13, wherein the computer-executable instructions are further executable to cause the at least one processor to receive, from the client computing device via the Internet, a registration from the first user.

17. The at least one non-transitory computer-readable storage medium of claim 13, wherein the computer-executable instructions are further executable to cause the at least one processor to identify transactions associated with the first account by searching data identifying the first account.

* * * * *